UNITED STATES PATENT OFFICE.

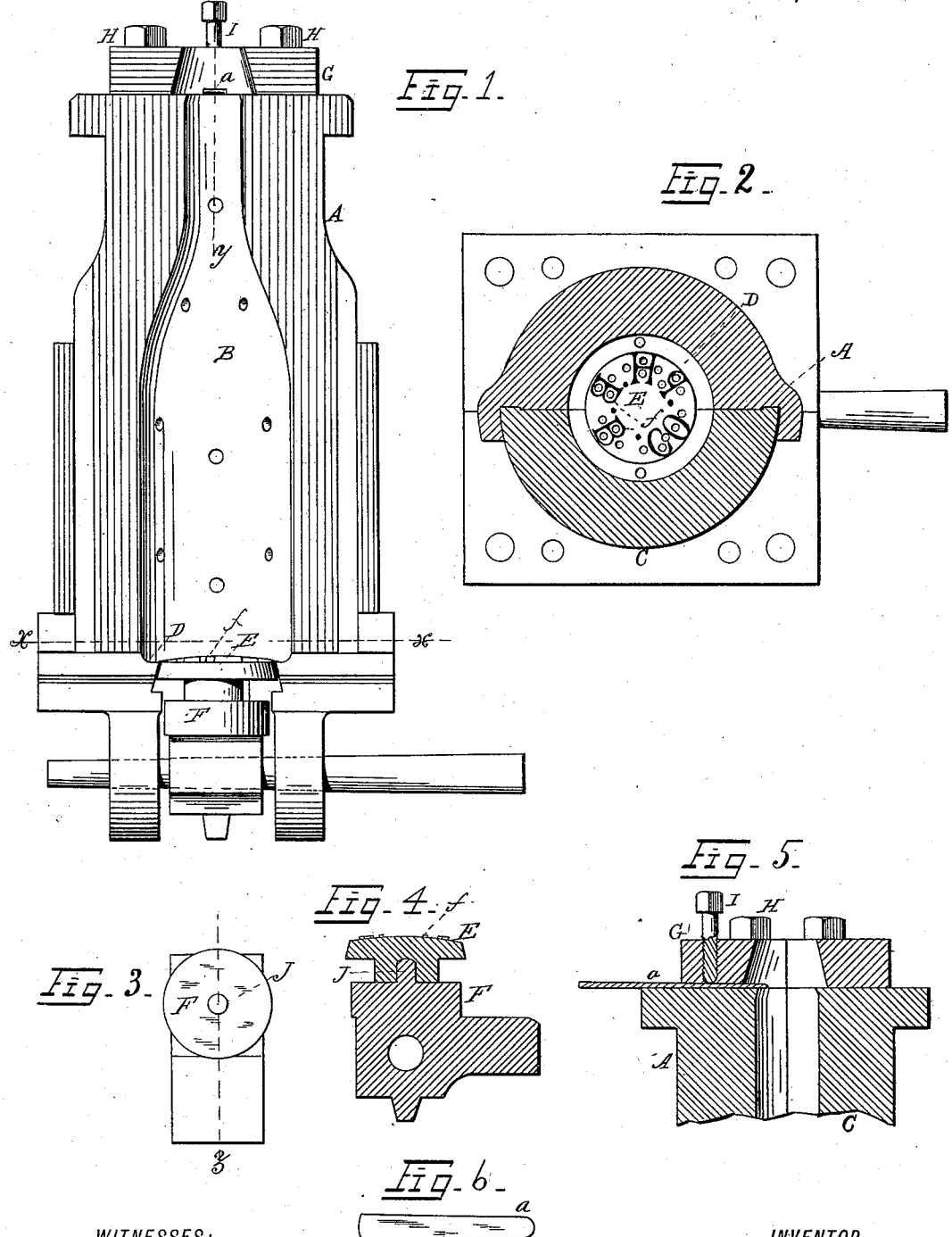

WILLIAM F. MODES, OF STREATOR, ILLINOIS.

MOLD FOR BLOWING TURNED BOTTLES.

SPECIFICATION forming part of Letters Patent No. 364,840, dated June 14, 1887.

Application filed January 31, 1887. Serial No. 225,955. (No model.)

*To all whom it may concern:*

Be it known that I, WILLIAM F. MODES, a citizen of the United States, and a resident of Streator, in the county of La Salle and State of Illinois, have invented a new and useful Improvement in Molds for Blowing Turned Bottles with Lettered Bottoms, of which the following is a specification, reference being had to the accompanying drawings, illustrating the invention, in which—

Figure 1 is a face view of one half of bottle-mold in which is embodied my improvement; Fig. 2, a horizontal section and plan of Fig. 1 on line X, looking down, showing the portion of the other half of the mold; Fig. 3, a plan of the hinged bottom to the mold removed from the other parts; Fig. 4, a vertical central section of Fig. 3 on line Z, with my improvement in rotating disk shown in section thereon; Fig. 5, a transverse vertical section of the top portion of Fig. 1 on line Y, showing the tool for severing the surplus glass from the top of the bottle, the position of the other half of the mold being shown. Fig. 6 is a plan view of the said tool removed from the other parts.

The nature of the present invention consists, first, in a rotary bottom which has formed in relief on its top portion the characters or marks which are to be imprinted in the bottom of the bottle which is to be turned in the mold to give it an exterior finish.. It is old to turn bottles in molds for polishing purposes, and it is old to imprint characters on the bottom of bottles which are not turned in the mold; but I claim to be the first one to employ a rotary bottom in the mold.

The second part of my invention consists in an adjustable cutter placed on top of the mold, whereby it, by the rotation of the glass in the mold, will so nearly sever the surplus material when the glass is soft that a little jar will break off the part to be removed. The means now employed for severing the surplus glass is a file kept wet with water, involving considerable labor as compared with my cutter, and the work is not so well done.

A C represent the two halves of an ordinary bottle-mold, and F is the hinged bottom-support thereof.

E represents my rotating bottom, which is pivoted to the hinged bottom F at J, and has a smooth level bearing on the circular top of F. As shown at D, Figs. 1 and 2, the mold is turned inward, to form the rounded lower corners of the bottle, and the rotary bottom E fills closely the interspace between said rounded corners.

*f* represents the characters in relief on the bottom E.

A represents the tool for severing the surplus glass, and, as shown, it is secured to the top of the mold by a clamp, G, and set-screws H I. The tool may, however, be connected with an ordinary set-screw, to gage its projection inward from the mold.

This mold, as shown, is to be used in the same manner as any mold where glass is turned when being blown. The bottom F, carrying the rotating bottom E, is to be swung outward and downward, to remove the bottle from the mold.

Having thus described my invention, I claim as new and desire to secure by Letters Patent of the United States—

1. The rotatable bottom E, provided with the upwardly-projecting letters or figures *f* on its top portion, in combination with the side molds, A C, and the hinged table F, to which the bottom E is pivoted at J, as specified and shown.

2. The mold A C, combined with a tool, A, for cutting off the surplus glass from the top of the bottle, as specified.

WILLIAM F. MODES.

Witnesses:
A. B. MCCONOUGHEY,
H. H. DIMS.